United States Patent [19]

Sieghartner

[11] 4,173,350

[45] Nov. 6, 1979

[54] FLOATING SEALS

[75] Inventor: Leonard J. Sieghartner, Coal Valley, Ill.

[73] Assignee: Roy E. Roth Company, Rock Island, Ill.

[21] Appl. No.: 931,499

[22] Filed: Aug. 7, 1978

[51] Int. Cl.² .............................................. F16J 15/16
[52] U.S. Cl. ....................................... 277/40; 277/83; 277/94; 277/173; 277/169
[58] Field of Search .............................. 277/27, 38–41, 277/45, 48, 47, 87, 83, 85, 92, 94, 95, 117, 118, 119, 144, 173, 176, 169, 177, 174, 175

[56] References Cited

U.S. PATENT DOCUMENTS

| 2,503,086 | 4/1950 | Albright | 277/87 |
| 2,549,112 | 4/1951 | Miller | 277/38 |
| 3,319,968 | 5/1967 | Yost | 277/40 |

FOREIGN PATENT DOCUMENTS

| 1282935 | 12/1961 | France | 277/40 |
| 946534 | 1/1964 | United Kingdom | 277/40 |

Primary Examiner—Robert S. Ward, Jr.
Attorney, Agent, or Firm—Emrich, Root, O'Keeffe & Lee

[57] ABSTRACT

A floating seal embodying a tubular bushing non-rotatably mounted in a tubular housing having a radially inwardly projecting flange on one end thereof, the bushing having an annular recess formed in the outer annular corner thereof which faces the aforementioned flange, with an O-ring mounted in the recess between the bushing and the aforementioned corner, with the bushing being movable axially of the housing, by pressure applied to the end of the bushing remote from the aforementioned flange, into position to compress the O-ring between the surface of the bushing defining the recess and the inner surfaces of the housing and flange defining the aforementioned corner.

9 Claims, 5 Drawing Figures

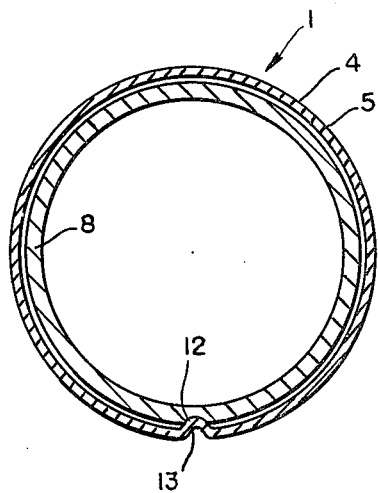
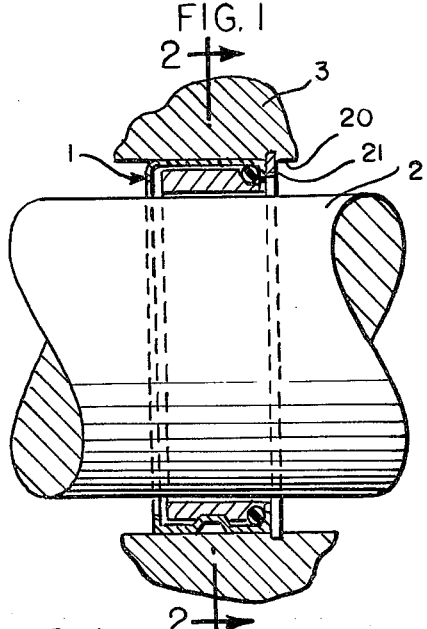
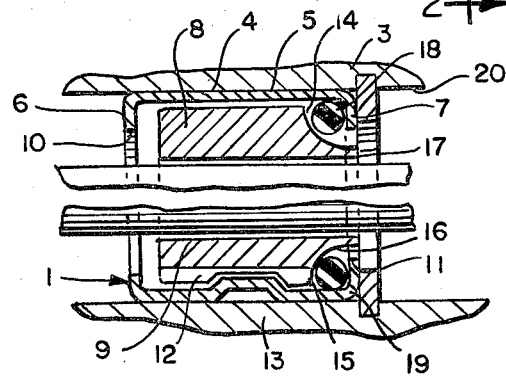
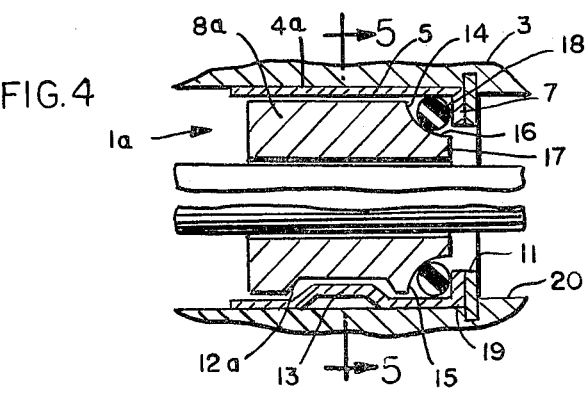
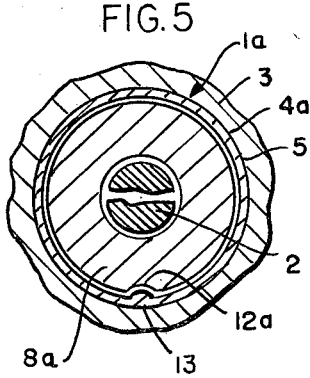

FLOATING SEALS

BACKGROUND OF THE INVENTION

This invention relates to seals, and, more particularly, to floating seals for use in sealing against the flow of liquid under pressure axially along a rotatable shaft in a rotary pump, or the like.

A primary object of the present invention is to afford a novel floating seal.

Floating seals for rotatable shafts have heretofore been known in the art, being shown, for example, in Wahl U.S. Pat. No. 3,389,916; and floating seals for rotary pump shafts, and the like, have been heretofore known in the art, being shown, for example, in my earlier U.S. Pat. Nos. 3,154,020 and 3,168,871.

It is an important object of the present invention to afford a novel floating seal which constitutes an improvement over floating seals heretofore known in the art.

Another object of the present invention is to afford a novel floating seal embodying a resilient sealing member disposed therein in a novel and expeditious manner in position to sealingly engage three sealing surfaces.

Another object of the present invention is to afford a novel floating seal embodying an annular bushing mounted in an elongated housing having a radially inwardly projecting flange at one end thereof, with a resilient annular sealing ring mounted in a recess in an outer peripheral corner of the bushing in position to engage both the outer side wall of the housing and the aforementioned flange thereof.

An object ancillary to the foregoing is to afford a novel seal of the aforementioned type wherein the central portion of the face of the bushing adjacent to the aforementioned flange is of such diameter that it may move into and out of the flange in spaced relation thereof.

A further object of the present invention is to afford a novel floating seal of the aforementioned type which is practical and efficient in operation, and which may be readily and economically produced commercially.

Other and further objects of the present invention will be apparent from the following description and claims and are illustrated in the accompanying drawings, which, by way of illustration, show the preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a transverse sectional view through a floating seal embodying the principles of the present invention, showing the seal mounted in operative position on a rotatable shaft;

FIG. 2 is a transverse sectional view through the seal shown in FIG. 1, taken substantially along the line 2—2 in FIG. 1;

FIG. 3 is an enlarged, fragmentary, detail sectional view similar to FIG. 1;

FIG. 4 is a view similar to FIG. 3, but showing a modified form of the present invention; and FIG. 5 is a sectional view taken substantially along the line 5—5 in FIG. 4.

DESCRIPTION OF THE EMBODIMENTS SHOWN HEREIN

A seal 1, embodying the principles of the present invention, is shown in FIGS. 1–3 to illustrate the presently preferred embodiment of the present invention.

In FIGS. 1 and 3, the seal 1 is shown mounted on a rotatable shaft 2 in the casing 3 of a suitable machine, which could be, for example, a rotary pump.

The seal 1 embodies an outer housing 4 having an annular or tubular outer wall 5 and two annular flanges 6 and 7 projecting radially inwardly from respective ends of the wall 5, FIG. 3. An annular or tubular bushing 8, having an opening 9 extending axially therethrough, is mounted in the housing 4 with the opening 9 disposed in substantially axially aligned relation to the openings 10 and 11 extending through the flanges 6 and 7, respectively. The annular bushing 8 has a smaller outside diameter than the inside diameter of the wall 5 of the housing 4 and is of lesser length than the distance between the flanges 6 and 7, so that the bushing 8 is able to move transversely and longitudinally, relative to the longitudinal axis of the housing 4, as will be discussed in greater detail presently.

The bushing 8 has an elongated slot 12 formed in the outer peripheral surface thereof and extending the length of the bushing 8; and the outer wall 5 of the housing 4 has a dimple 13 formed therein, which projects into the slot 12 so as to hold the bushing 8 against rotation in the housing 4 while permitting longitudinal and lateral movement of the bushing 8 relative to the housing 4.

An annular recess 14 is formed in the annular, outer peripheral corner of the bushing 8, which is disposed adjacent to the flange 7 of the housing 4. The recess 14 has a main body portion 15, which is arcuate in shape, and terminates at its axially outermost portion 16, which is disposed adjacent to the flange 7, in a reduced end portion 17 of the bushing 8, the outer peripheral surface of which is substantially parallel to the longitudinal axis of the bushing 8, FIG. 3.

In the assembled seal 1, an O-ring 18, made of suitable resilient material, such as, for example, rubber, is mounted in the recess 14 in the bushing 8 in position to be confined between the bushing 8 and the adjacent corner 19 of the housing 4 defined by the side wall 5 and the flange 7 thereof. The O-ring 18 is of somewhat smaller outside diameter than the inside diameter of the outer wall 5 of the housing 4 so that the O-ring 18 is free to float therein and center itself radially within the housing 4. With this construction, when pressure is applied to the end of the bushing 8, which is adjacent to the flange 6, in a direction axially of the bushing 8, the bushing 8 is caused to move toward the flange 7, to thereby move the O-ring 18 outwardly into the corner 19 of the housing 4 and clamp the O-ring 14 between the surface of the bushing 8, defining the recess 14, and the adjacent inner surfaces of the outer wall 5 and the flange 7 of the housing 4. The arcuate shape of the recess 14 causes the O-ring 18 to move therealong with a rolling motion as the O-ring is so pressed into the corner 19.

Preferably, the end portion 17 of the bushing 8 projects outwardly from the arcuate body portion 15 of the recess 14 a distance between one-half and two-thirds of the thickness or diameter of the body portion of the O-ring 18; the difference between the inside diameter of the flange 7 and the outside diameter of the end portion 17 of the bushing 8 is no more than one-half the aforementioned thickness or diameter of the body portion of the O-ring 18; and the radius of the arc of the body portion 15 of the recess 14 is between two and three times the radius (or one-half the thickness) of the body portion of the O-ring 18. With this construction: the O-ring is effectively retained in the housing 4; the bushing 8 is free to apply effective light or heavy compressive sealing forces on the O-ring 18 in accordance with whether the pressure applied thereto by the pressurized liquid is low or high, respectively, the end portion 17 of the bushing 8 being free to move outwardly through the flange 7 when higher pressures are applied to the bushing 8; and the recessed portion of the bushing 8 tends to force the O-ring 18 outwardly into the corner 19 of the housing 4 with a rolling motion rather than a straight-line or sliding motion.

The housing 4 may be made of any suitable material, such as, for example, steel, and the bushing 8 may be made of any suitable material, such as, for example, bronze. The opening 9 through the bushing 8 preferably is of slightly greater diameter than the shaft which it is to accommodate, such as, for example, the shaft 2, such as, for example, having a diameter in the nature of 0.002 inches greater than that of the shaft, so as to receive the shaft with a snug, but freely rotatable fit. The difference in the outside diameter of the bushing 8 and the inside diameter of the wall 5 of the housing 4 preferably is greater than the difference in diameter of the opening 9 and the outside diameter of the shaft accommodated therein, such as, for example, twice to three times the difference so that the bushing 8 is free to float in the housing 4 upon deflection of such a shaft and thereby prevent binding of the shaft in the seal 1.

In the operation of the seal 1, it may be mounted in a suitable opening in a machine, such as, for example, in the opening 20 in the machine casing 3, shown in FIG. 1. Preferably, the housing 4 is of such transverse size that it fits into the opening 20 with a snug, frictional fit, and is of such length that when it is so disposed in operative position in the opening 20, the flange 7 thereof is abuttingly engaged with a suitable abutment member, such as, for example, a snap ring 21 disposed in the opening 20. After the seal 1 is thus disposed in the opening 20, the shaft 2 may be inserted longitudinally through the seal 1 into its operative position in the casing 3.

With the seal 1 thus disposed in operative position relative to the shaft 2 and the casing 3, it is effective to prevent the passage of liquid under pressure from left to right, as viewed in FIGS. 1 and 3, along the shaft 2 through the seal 1. With this construction, when pressure is applied to the left side of the seal 1, as viewed in FIGS. 1 and 3, which is greater than the pressure applied to the right side thereof, the imbalance of pressure is effective to force the bushing 8 to the right, as viewed in FIGS. 1 and 3, and thereby sealingly clamp the O-ring 18 between the three surfaces afforded by the surface of the bushing 8, defining the recess 14, and the inner surfaces of the outer wall 5 and the flange 7 of the housing 4 and thus prevent flow of the pressurized liquid through the seal 1 between the bushing 8 and the housing 4. As is true in floating seals heretofore known in the art, the clearance between the bushing 8 and the shaft, such as the shaft 2, disposed therein is so slight that it does not afford an effective passageway for leakage of the aforementioned pressurized liquid therebetween through the seal 1.

With this construction, it will be seen that the seal 1 may be readily manufactured by first forming the housing 4 with only the one flange 7 thereon, and with the dimple 13 formed therein; and forming the bushing 8 as a separate piece. Thereafter, with the end of the housing 4 remote from the flange 7 facing upwardly, the O-ring 18 may be dropped into the housing 4, and the bushing 8 may then be dropped into the housing 4, with the slot 12 aligned with the dimple 13, and the end of the housing 4, remote from the flange 7 may then be crimped to form the flange 6. With this construction, a unitary, assembled seal, which may be readily mounted, as a unit, in operative position in a machine may be readily manufactured.

A modified form of the present invention is shown in FIGS. 4 and 5. Parts shown in FIGS. 4 and 5 which are the same as parts shown in FIGS. 1–3 are indicated by the same reference numerals, and parts shown in FIGS. 4–5 which are similar to parts shown in FIGS. 1–3 are indicated by the same reference numerals with a suffix "a" added.

The seal 1a shown in FIGS. 4 and 5 is the same in construction as the seal 1 shown in FIGS. 1–3, except that the housing 4a thereof does not embody a flange corresponding to the flange 6 of the housing 4, and the slot 12a in the outer peripheral surface of the bushing 8a does not extend the entire length thereof.

In the bushing 8a, although the slot 12a is longer than the dimple 13, it is disposed in inwardly spaced relation to both ends of the bushing 8a, FIG. 4. With this construction, in the manufacture of the seal 1a, the housing 4a may be first constructed with only the outer wall 5 and the flange 7, and the O-ring and the bushing 8a may then be dropped down into operative position in the housing 4a. Thereafter, the dimple 13 may then be formed in the wall 5 of the housing 4a in position wherein it projects into the slot 12a in the bushing 8a and is effective to prevent withdrawal of the bushing 8a from the housing 4a and to prevent rotation of the bushing 8a in the housing 4a, while permitting the bushing 12a to move back and forth axially within the housing 4a, the length of such movement being determined by the difference of the lengths of the slot 12a and the dimple 13 longitudinally of the bushing 8a.

The operation of the seal 1a is the same as that of the seal 1, and it may be mounted in a machine in the same manner as heretofore discussed with respect to the seal 1.

From the foregoing it will be seen that the present invention affords a novel floating seal.

In addition, it will be seen that the present invention affords a novel floating seal which is practical and efficient in operation, and which may be readily and economically produced commercially.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A seal for mounting in a portion of a casing in sealing relation with a shaft rotatably supported in said casing for inhibiting flow of pressurized liquid through said portion of said casing, axially of said shaft, from one position in said casing to another position in said casing, said seal comprising:
- a. a housing comprising
  - (1) a tubular outer wall, and
  - (2) and an annular flange projecting substantially radially inwardly from one end of said outer wall,
- b. said housing being adapted to be mounted in said portion of said casing in sealing relation thereto with
  - (1) the end of said outer wall remote from said flange facing toward said one position, and
  - (2) the axially outer face of said flange facing toward said other position,
- c. an annular bushing mounted in said housing,
- d. said annular bushing having
  - (1) an opening therethrough of a size to receive such a shaft therein with a closely fitting loose fit,
  - (2) an annular outer surface of a size to fit in said outer wall with a looser fit than said first mentioned fit, and
  - (3) a recess, of arcuate cross sectional shape, extending annularly around said bushing and formed in one outer annular corner of said bushing,
- e. said recess opening outwardly toward the junction of said outer wall with said flange,
- f. a resilient O-ring mounted in said recess and extending therearound between said bushing and said flange,
- g. said O-ring having a lesser thickness than the length of the chord of said arc,
- h. said bushing having an elongated slot formed in the outer periphery thereof and disposed in substantially parallel relation to the longitudinal axis of said bushing,
- i. means on said housing and extending into said slot for holding said bushing against rotation in said housing while permitting said bushing to move axially in said housing so that said O-ring is pressed into sealing engagement with said flange and said outer wall by pressure on the side of said bushing remote from said flange in an axial direction relative to said bushing.

2. A seal as defined in claim 1, and in which
- a. said slot terminates at its opposite ends in inwardly spaced relation to the ends of said housing.

3. A seal as defined in claim 1, and in which
- a. said slot extends the length of said housing and opens outwardly through the ends thereof.

4. A seal as defined in claim 1, and in which
- a. said flange is of such width that the inner peripheral edge thereof defines an opening of greater width than the diameter of said shaft, and
- b. said bushing has a thickness at the face thereof adjacent said flange, between the central opening extending axially therethrough and the adjacent portion of said arcuate recess, which is less than the difference between the width of said other flange and the diameter of said shaft.

5. A seal as defined in claim 1, and in which
- a. said flange has an axial opening therethrough which is round in transverse cross section,
- b. the portion of the face of said annular bushing disposed immediately adjacent to said flange and defined at its inner surface by the central opening through said annular bushing and at its outer surface by said arcuate recess has an annular outer surface having a lesser diameter than the diameter of said opening through said flange, and the radius of which is such that the difference in the radii of said opening through said flange and said last mentioned annular outer surface is not substantially more than one-fourth the thickness of said O-ring.

6. A seal as defined in claim 5, and in which
- a. the annular outer surface of said annular bushing extending inwardly from said face disposed immediately adjacent to said flange is substantially parallel to the longitudinal axis of said annular bushing for a distance inwardly from said last mentioned face not substantially less than one-half the thickness of said O-ring.

7. A seal as defined in claim 6, and in which
- a. said O-ring is disposed in said outer wall of said housing with a loose fit.

8. A seal for mounting in a portion of a casing in sealing relation with a shaft rotatably supported in said casing for inhibiting flow of pressurized liquid through said portion of said casing, axially of said shaft, from one position in said casing to another position in said casing, said seal comprising:
- a. a housing comprising
  - (1) an annular outer wall, and
  - (2) two annular flanges projecting substantially radially inwardly from respective axially-opposite side edges of said outer wall,
- b. said housing being adapted to be mounted in said portion of said casing in sealing relation thereto with
  - (1) the axially outer face of one of said flanges facing toward said one position, and
  - (2) the axially outer face of the other of said flanges facing toward said other position,
- c. an annular bushing mounted in said housing,
- d. said annular bushing having
  - (1) an opening therethrough of a size to receive such a shaft therein with a closely fitting loose fit,
  - (2) an annular outer surface of a size to fit in said outer wall with a looser fit than said first mentioned fit, and
  - (3) a recess, of arcuate cross sectional shape, extending annularly around said bushing and formed in one outer annular corner of said bushing,
- e. said recess opening outwardly toward the junction of said outer wall with said other flange,
- f. a resilient O-ring mounted in said recess and extending therearound between said bushing and said other flange,
- g. said bushing being of lesser axial length than the distance between said two flanges,
- h. said O-ring having a lesser thickness than the length of the chord of said arc,
- i. said bushing having an elongated slot formed in the outer periphery thereof and disposed in substantially parallel relation to the longitudinal axis of said bushing, and
- j. means on said housing and extending into said slot for holding said bushing against rotation in said housing while permitting said bushing to move axially in said housing so that said O-ring is pressed into sealing engagement with said other flange and said outer wall by pressure on the side of said bushing adjacent said one flange in an axial direction relative to said bushing.

9. A seal as defined in claim 8, and in which a. said slot extends the entire axial length of said bushing, and
b. said means for holding said bushing against rotation comprises a dimple formed in said housing and projecting into said slot.

* * * * *